Oct. 10, 1967     M. J. PRINCE ET AL     3,346,459

NUCLEAR REACTORS

Filed July 18, 1966     2 Sheets-Sheet 1

Oct. 10, 1967   M. J. PRINCE ET AL   3,346,459
NUCLEAR REACTORS
Filed July 18, 1966   2 Sheets-Sheet 2
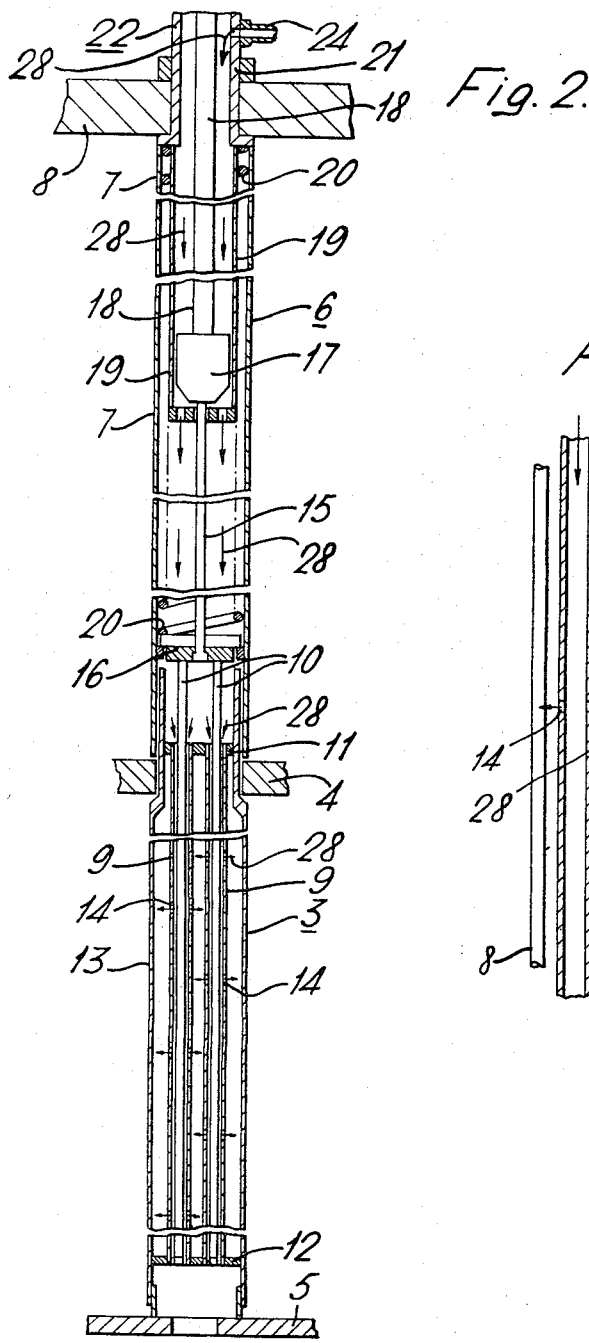
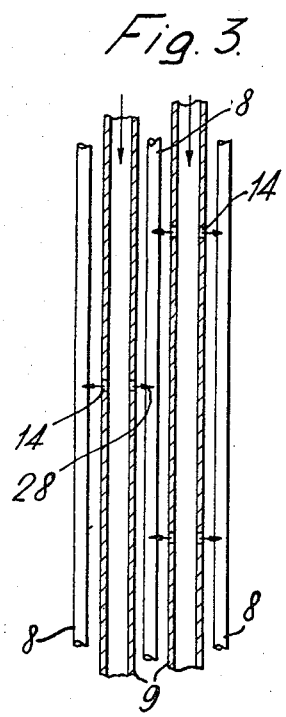

United States Patent Office 3,346,459
Patented Oct. 10, 1967

3,346,459
NUCLEAR REACTORS
Michael John Prince, Widnes, and Geoffrey Douglas Ainsworth, Heald Green, England, assignors to United Kingdom Atomic Energy Authority, London, England
Filed July 18, 1966, Ser. No. 565,764
Claims priority, application Great Britain, July 28, 1965, 32,379/65
4 Claims. (Cl. 176—36)

ABSTRACT OF THE DISCLOSURE

In a fuel rod cluster for a nuclear reactor, guide tubes are interspersed among the fuel rods. Control pins are insertable with clearance into these tubes by an operating assembly. For causing the fuel rods to be sprayed with a fluid coolant should an emergency condition arise, the operating assembly is adapted to enable a fluid coolant to be supplied, when required, to the guide tubes and these guide tubes are perforated over substantially their entire lengths to eject the coolant as spray onto the fuel rods.

The present invention relates to nuclear reactors.

There has been proposed a nuclear reactor comprising a bulk of moderating material penetrated by a plurality of pressure tubes housing fuel rod clusters and for conducting fluid coolant, fluid coolant spraying means disposed within said fuel rod clusters, conduit means connecting said fluid coolant spraying means to a source of coolant supply, a fluid flow control valve included in said conduit means said control valve being sensitive to a pre-determined emergency condition of the reactor whereby, upon receipt of a signal by the control valve indicating incidence of said pre-determined emergency condition, the control valve is opened and the fuel rods are sprayed with coolant delivered through said conduit means.

The present invention is based upon utilizing as a fluid coolant spraying means a series of guide tubes in which control pins are received upon insertion into a cluster of fuel rods, the guide tubes being perforated for this purpose. Accordingly the invention provides in a nuclear reactor a fuel rod cluster, perforated guide tubes interspersed among the fuel rods of the cluster, control pins insertable with clearance into the guide tubes, an operating assembly for inserting and withdrawing the control pins, and conduit means adapted when required to supply fluid coolant to the operating assembly, the latter being so adapted that coolant thus supplied passes to the guide tubes to be sprayed therefrom over the fuel rods.

One embodiment of the invention is described below with reference to the accompanying exemplifying drawings in which:

FIGURE 2 is an enlarged sectional elevation of a part of FIGURE 1.

FIGURE 3 is an enlarged view of a part of FIGURE 2, and

Figure 1:
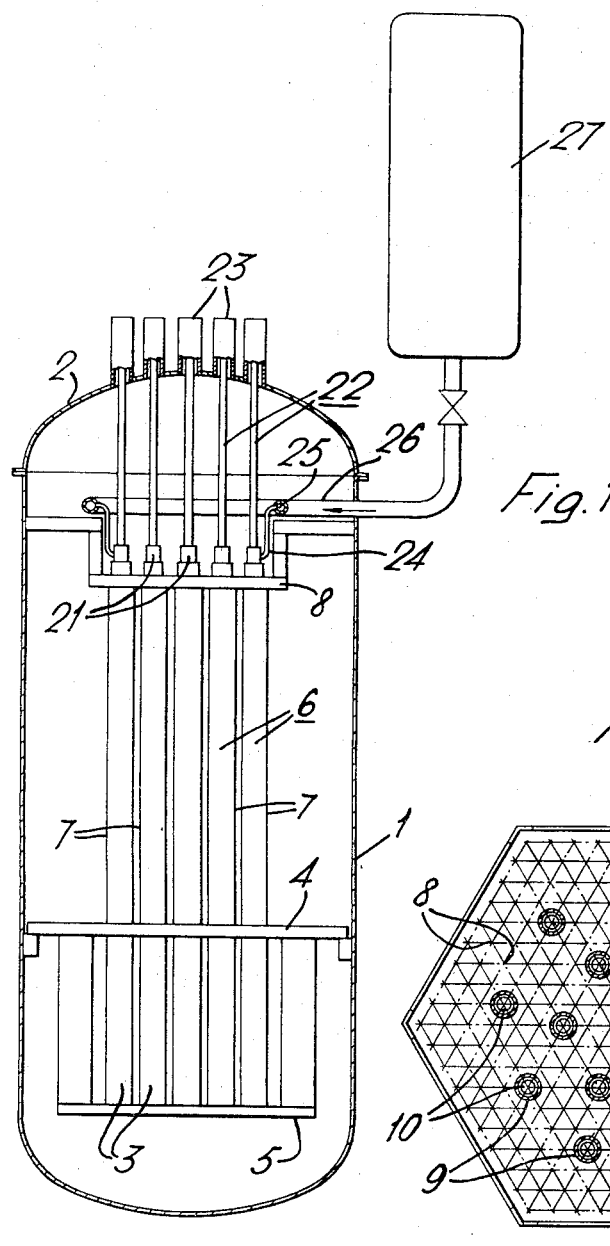
FIGURE 1 is a diagrammatic representation of a nuclear reactor.

The drawings show a nuclear reactor comprising a pressure vessel 1 (FIG. 1) having a lid 2 and housing a core made up of fuel rod clusters 3 extending between upper and lower core support grids 4, 5 respectively, which grids are mounted in the vessel 1. Each cluster 3 is associated with an operating assembly 6 comprising a control mechanism housing 7 extending between a control mechanism support grid 8 and the grid 4, the housings 7 each being open-ended and in communication with their associated cluster 3 in the region of the grid 4.

Figure 4:
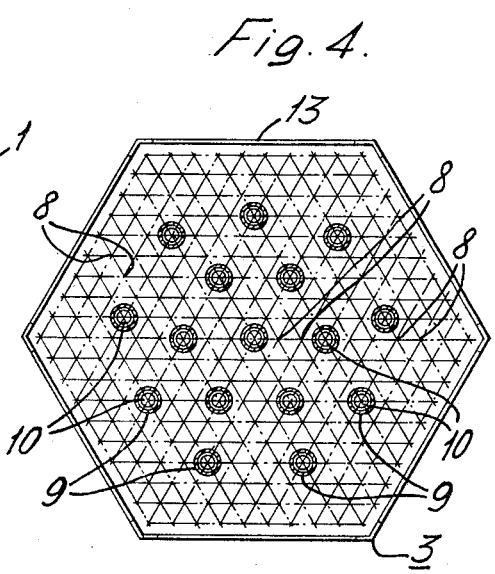
FIGURE 4 is an enlarged plan view of a fuel rod cluster of the reactor.

Each fuel cluster 3 (FIGS. 2 to 4) comprises a number of spaced elongate fuel rods 8 (shown for clarity as points representing their longitudinal axes in FIG. 4) arrayed on a generally symmetrical triangular lattice with spaces left however for guide tubes 9 interspersed among the fuel rods or pins 8 of the cluster 3. Control pins 10 are insertable with clearance in the guide tubes 9, and the parallel fuel rods 8 and guide tubes 9 extend between upper and lower fuel cluster support grids 11, 12 respectively, which grids are mounted in a hexagonal open-ended shroud or sleeve 13 of the cluster 3. Over their length the guide tubes 9 have perforations, some of which are shown and designated 14. The perforations of one tube are staggered relative to those of an adjacent tube.

Each tubular housing 7 contains an axially movable piston 15 releasably connected at its lower end to a carrier 16 from which the control pins 10 of a fuel rod cluster 3 are carried. The upper end of the piston 15 is connected by a releasable connection 17 to a driven member 18 and is housed in an apertured dashpot 19 mounted from the housing 7. A scram spring 20 effectively extends between the carrier 16 and the grid 8, and in the region of the grid 8 the housing 7 communicates with a housing 21 of a control mechanism drive system 22 forming part of the operating assembly 6. The driven members 18 of the systems 22 are actuated by motors 23 (FIG. 1) mounted on the lid 2.

As shown in FIGS. 1 and 2 the housing 21 have conduit means in the form of pipe connections 24 from a manifold 25 itself having a pipe connection 26 passing through the vessel 1 and in valved communication with an emergency coolant supply in a storage tank 27.

When required, coolant from the tank 27 is caused to flow through the pipe 26 to the manifold 25 and pipe connections 24 and thus into the housings 21 to flow downwardly in the housing 7 into the upper ends of the tubes 9 to spray out through the perforations 14 on to adjacent fuel rods 8, such flow being indicated by arrows 28.

Since the invention is primarily concerned with spray cooling when required, the drawings have been simplified by omission of details of circuit components for normal coolant flow. For a general indication of the disposition of such components in a reactor to which the present invention is applicable, reference may be made for example to FIGURE 2 of the article entitled "Safety in Nuclear Ships" appearing in "Atom," number 101 of March 1965.

It will be appreciated that in accordance with the invention the guide tubes assume a multi-purpose role: not only do they fulfill the original purpose of guiding for a reactivity controlling assembly of the type having control pins, but in case of need they act as spray means and being as a general rule fairly evenly interspersed among the fuel rods the spray will be widely distributed.

The occurrences calling for use of the spray are in the nature of emergency conditions when steps will be taken to shut down the reactor. If, as is usual, the control pins exercise the controlling function by virtue of a content of neutron absorber material, as distinct from the alternative of fuel, they will be inserted at time when the spray is required; this calls for a sufficient clearance between the tubes and the control pins for passage of the desired volume of coolant to be sprayed.

It is known already for guide tubes as herein specified to be perforated over a portion of length to provide passage of the coolant which normally cools the core and to permit rapid shut-down insertion of the control pins. Preferably the perforations for present purposes are distributed uniformly over the whole length of each guide tube with the possible exception of a short terminal length adjacent the closed end of the tube. At this terminal length, the perforations may be absent, or they may be metering orifices of a different size, so that by a dashpot action the pins are subject to end-of-stroke cushioning when a rapid shutdown insertion is made. In the present context it is to be inferred that the size of the perforations is suitable for the coolant supplied through the operating assembly to the tubes to issue from the perforations with some fair degree of uniformity. The perforations are so arranged that their positions are staggered relative to the perforations of adjacent tubes thereby giving increased coverage of the fuel rods by the spray means.

The adaptation of the operating assembly for passing the coolant supplied from the conduit means to the guide tubes calls for a construction in which virtually the only outlet path from spaces which such coolant can reach is through the guide tubes. An arrangement which lends itself to this requirement is one where the operating assembly includes a tubular housing with an open end which can be coupled to the end of a casing or wrapper in which the fuel rod cluster is carried, such as is the case in the example described above.

The connection of the conduit means to the operating assembly may have to be made or unmade each time the assembly is installed and removed and would then be of a kind to facilitate these operations. As a possible alternative the connection may be in the form of a slip joint; such joint may connect the assembly directly with a common conduit header with which other assemblies are likewise connected. The coolant supply through the conduit means may be under gravity from an elevated storage tank as in the example described above or alternatively by means of a pump system. In this alternative system a choice of pumps may be available; for example, in the case of a pressurised water reactor, there may be a pump of high pressure and low volume delivery suitable for meeting the occurrence of a low rate of depressurisation and escape of the pressurised water coolant and also a pump of low pressure and high volume delivery where the same occurrence is at a fast rate.

We claim:

1. A nuclear reactor comprising a fuel rod cluster, perforated guide tubes interspersed among the fuel rods of the cluster, control pins insertable with clearance into the guide tubes, an operating assembly for inserting and withdrawing the control pins, and conduit means adapted when required to supply fluid coolant to the operating assembly, the latter being so arranged as to pass coolant thus supplied to the guide tubes to be sprayed therefrom over the fuel rods.

2. A nuclear reactor as claimed in claim 1, wherein the operating assembly includes a tubular housing with an open end coupled to the end of a casing in which the fuel rod cluster is carried.

3. A nuclear reactor as claimed in claim 2, wherein the conduit means is connected to the housing at a region thereof remote from the open end coupled to the casing.

4. A nuclear reactor as claimed in claim 3, wherein the perforations of a guide tube are distributed uniformly over substantially the whole length of that guide tube and the perforations are so arranged that their positions on one guide tube are staggered relative to those of an adjacent tube.

References Cited

Power Reactor Technology, vol. 8, No. 2, 1965, pp. 145–147.

CARL D. QUARFORTH, *Primary Examiner.*

H. E. BEHREND, *Assistant Examiner.*